Dec. 14, 1943.   H. MAGINN   2,336,693
THRESHER CYLINDER CONSTRUCTION
Original Filed May 21, 1941
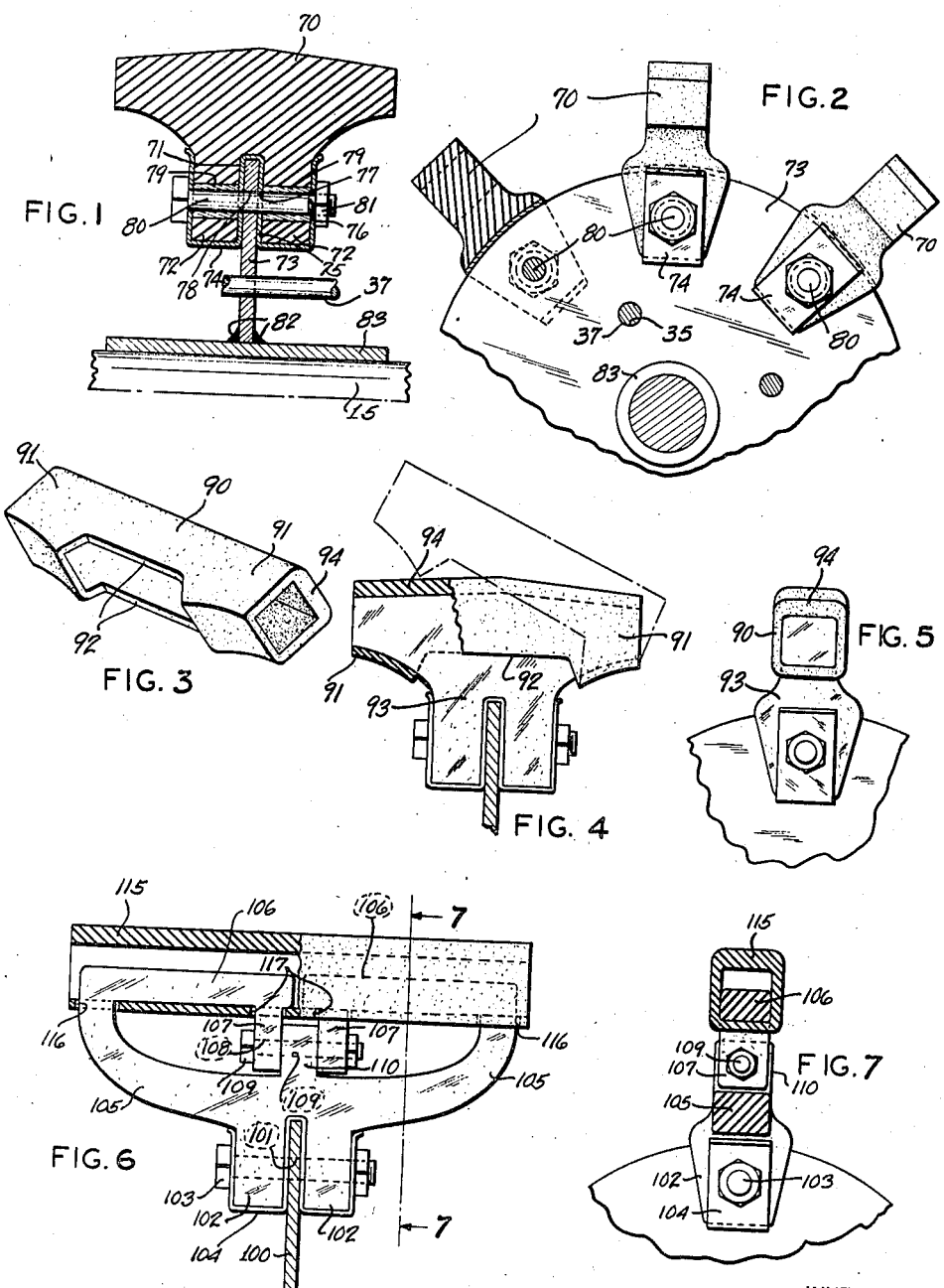
INVENTOR
HAROLD MAGINN
BY
Evans & McCoy
ATTORNEYS Patented Dec. 14, 1943

2,336,693

UNITED STATES PATENT OFFICE 2,336,693

THRESHER CYLINDER CONSTRUCTION

Harold Maginn, Waverly, Ill.

Original application May 21, 1941, Serial No. 394,455. Divided and this application June 11, 1942, Serial No. 446,573

5 Claims. (Cl. 130—27)

This invention relates to improvements in thresher cylinder construction, and more particularly to improved means for assembling, for individually attaching, removing and replacing a plurality of resilient threshing arms or bar sections to the body of a rotatable cylinder utilized in the separation of grain, beans, grass crops and the like.

The present application is concerned with the type of apparatus forming the subject matter of my Patent 2,265,380, issued December 9, 1941, and is a division of my copending application Serial No. 394,455, filed May 21, 1941, and entitled Threshing cylinder construction. Attention is also directed to a companion application covering related improvements bearing Serial No. 394,454 and filing date of May 21, 1941.

The general objects of the present invention are broadly similar in nature to those severally set forth in the applications above identified. These include the provision, in keeping with the present and earlier filed applications, of an improved shaping and mounting of resilient beater arms or threshing elements in a bar-type cylinder, the form and resilient construction of which elements present several marked advantages over the conventional metal threshing elements of separator cylinders, and numerous other advantages over the metal-backed rubber elements heretofore recently sold to the trade to a considerable extent.

A general advantage of the present invention may be stated as attained in a softer threshing action, by which is meant a separation of the grain from appurtenant straw and hull portions by a more gentle engagement of threshing elements, rather than by the sharp impact heretofore administered to the grain when threshed either by metal bars or by metal-backed rubber elements.

A further general object of the invention is atatined by present improvements in the provision of sectional cylinder bars the individual sections of which are yieldable either radially or angularly in any direction, whereby in the event hard objects such as stones find their way into the threshing zone, the improved cylinder will either yield in passing such objects, or will expel them, in most cases without serious damage, from the threshing zone.

Still another object of the invention is attained in an assembly having the advantages above noted, and yet which, in comparison with some former types of threshing cylinders, may be constructed at a much lower cost, serves to provide a greater ease of service attention, and a much lower parts-replacement expense. The facility for individual removal and replacement of worn or damaged bar-forming sections, materially reduces the out-of-service time heretofore required incident to comparable types of replacement attention to older threshing cylinders.

More specifically stated in reference to the structure which distinguishes the present improvements over those of the copending applications of this applicant, there may be noted the provisions of improved assembly means for easily replacing individual threshing bar sections, and removable boots or wear faces or sleeves for application over the yieldable bar sections. The advantages of these improvements reflect themselves in lower maintenance cost and improved facilities for replacing or renewing worn and broken threshing elements.

The foregoing and numerous other objects will be more fully apparent when the following detailed description is read in connection with the accompanying drawing illustrative of certain selected embodiments of the present improvements. In the drawing:

Fig. 1 is a partial sectional elevation of a form of anchorage or assembly means for detachable securement of an individual beater arm or threshing bar section to a mounting spider and shaft of the character disclosed in my copending applications referred to above;

Fig. 2 is a fragmentary sectional elevation in a radial plane transverse to the shaft and the axis of cylinder rotation, showing three individual beater arms with one thereof shown in section;

Fig. 3 is an isometric view of a replaceable boot or sleeve adapted to be mounted over one of the individual resilient beater arms as a replaceable wearing member;

Fig. 4 is a view similar to Fig. 1, and including a partial section of the wearing sleeve or boot, and showing in dotted lines the wearing boot in a position of partial application to or incomplete removal from the individual threshing arm;

Fig. 5 is an end elevation of the structure shown in Fig. 4, with the boot in a position of usage;

Fig. 6 is a side elevation partly in section of a modified form of beater bar with a bearing boot in place thereon and shown partly in section; and Fig. 7 is a sectional view of the structure of Fig. 6, as taken along line 7—7 thereof.

The general cylinder assembly is or may be closely similar to the built-up arrangement shown and described in copending applications Serial No. 394,454 and Serial No. 394,455. The cylinder body, including its threshing elements, may be built up of eight (the number being optional) laterally stacked sections, preferably horizontally disposed on a rotatable cylinder shaft 15. The shaft 15 is suitably journaled in end plates of the cylinder housing structure (not shown). Rotation or revolution of the cylinder is effected through a drive pulley and a belt driven from any suitable power takeoff pulley (not shown).

Referring now to the drawing by numerals of reference which are applied to like parts throughout the several views and which numerals correspond to the numerals employed in my application Serial No. 394,455, filed May 21, 1941, of which this application is a divison, the form of beater bar anchoring means shown in Figs. 1 and 2 may be regarded as a somewhat preferred form for commercial production and usage.

The individual units or sections each by preference includes a shaft-engaging sleeve 83 centrally of which is mounted a spider 73 occupying the central area of the unit. Any suitable form of securement for assembly purposes may be provided between the sleeve 83 and the spider 73, but this conveniently consists of fillet welds 82. The spider may be of a rugged low-cost construction when comprised of a circular disc of relatively heavy gauge metal.

The cylinder-forming units are stacked on the shaft 15 by insertion of the shaft through their respective sleeves 83 preferably so as to bring the latter into end-abutting relation. It will be noted as a preference that each of the spiders are provided with a series, as four, of tie rod apertures 35, these apertures being a predetermined relation to an outer row of bolt openings 78 for the reception of the anchoring bolts for the individual arms, as will appear. The arrangement is such that when the openings 35 are aligned in the spiders of the several units, the plurality, say four, of the tie rods 37 may be inserted through the assembled units of the cylinder and through the opposite end plates thereof (not shown) so as to bring the corresponding beater arms into substantial alignment, lengthwise of the cylinder. When the nut is taken up on each of the several tie rods 37, it will appear that the desired plurality of threshing sections of the cylinder constituting its body, are angularly tied together and are kept in angular register, the individual sections being prevented from rotating relative to each other through the provisions of rods 37, the latter extending through the end plates. These end plates being keyed to the shaft 15, the cylinder body will rotate as a unit. It is here parenthetically noted that the provision of the tie rods 37 is of great advantage in imparting a suitable rigidity to the sectional cylinder structure, since the present improvements are preferably employed in a cylinder operating within a rotative speed range of the order of 1300–1600 R. P. M. The rods being of low cost, this provision enables the present improvements to be installed in many existing combines and separators without necessarily increasing shaft size, or when utilized in new equipment, this arrangement enables the use of a smaller shaft 15 than would be necessary were the individual threshing units not thus operatively integrated.

Proceeding now to a more detailed discussion of suitable means for individual detachable assembly of the bar elements or beater arms 70 of each group or unit, to the spider therefor, it may be noted that each of the bars 70 is of a generally T-shape, being longer, in the direction of the axis, in its peripheral portion than in its inner portion, anchorage to the spider being effected through the latter part. It may also be noted that, as described and claimed in the copending application, Serial No. 394,454, each of the bars or arms is appreciably crowned, i. e., its center peripheral portion when at rest, lies at a somewhat greater radial distance from the axis of rotation than do the end portions. This provision is made because of resilience of the rubber or rubber-like stock constituting each bar, and so that when the cylinder is rotated at speed, the end portions will, being only remotely supported, assume a position to bring the threshing surface or extreme periphery of each bar, to substantially a planar relation to the corresponding surfaces of corresponding bars in adjacent units.

The substantial spacing between intermediate portions of adjacent units 70 enables not only a free circulation of air, as is desirable between the units, but enables ease of access of the hands and tools for detaching or replacing the individual bars without necessarily disassembling the units from the cylinder as a whole.

The bar, generally indicated at 70, in this case has its anchoring portion intermediately slotted or kerfed as at 71, resulting in a furcate form of securement portion, the furcations of which are identified with radially inwardly projecting legs 72. It is evident from Fig. 1 that the kerf or slot 71 is for the purpose of accommodating a peripheral portion of the spider 73 between the legs or furcations 72 of the beater bar. For better securement between the beater and spider, it is preferred to provide a metal saddle element 74 comprised of two axially spaced, upright H-shaped portions, the spacing of which and the angulate construction of the clip, results in a central, inverted U-shaped portion 75, which serves directly to engage and embrace the periphery of the spider 73.

The saddle 74 is by preference constructed of a hard tempered flat stock and may be vulcanized in place at the time of curing the bar 70, or otherwise expressed, may be bonded directly to the rubber or rubber-like stock of the bar. In this construction four apertures are provided in the saddle, those indicated at 76 being in the outer arm portions of the saddle and those indicated at 77 being in the inner arm portions thereof. The openings 76 and 77 being in register, are also in register with the bolt opening 78 provided in the periphery of the spider 73. It is further preferred to bridge, in each of the upright U-shaped parts of the saddle, the zones near the opposite openings 76 and 77, with a cylindrical bushing 79, the bushing being also desirably bonded in place in the rubber-like stock at the time of curing. These bushings 79 are of a suitable internal diameter so as readily to accommodate the attachment bolt 80. It will appear that the bushings 79, by bridging the opposite walls of the saddle, serve to maintain at all times a minimum spacing of the outer and inner saddle portions, and also serve to enhance the holding area of the stock of the bar to its securement means. It will now readily appear that removal or insertion of the attachment bolt 80 and its nut 81 enables ready removal of the bar 70 from the spider and an equally easy replacement.

In certain localities, particularly characterized by large amounts of gravel or other hard substances in the surface soils, it has been found advantageous to make provision for an even more economical renewal of the threshing elements having direct impact with the grain, grass, beans, peas or the like, than is afforded by even the low cost bar-forming sections or arms 70.

One such provision consists in a replaceable boot or sleeve facing adapted to be detachably mounted on and easily removed from the beater arms without the use of special tools, or of any specific attachment means for the boot other than provided by its own construction and shaping in relation to the form of the bars.

One suitable and thoroughly tested type of boot or protective sleeve, is indicated by Fig. 3 wherein the boot, indicated generally at 90, is of tubular form, and by preference, although not necessarily, of generally rectangular transverse section. The end portions 91 are of a sectional shape and contouring similar to the overhanging end portions of the bar to which the boot is attached. Intermediate the tubular end portions 91, which are in effect ring-like holding members, one or the inner wall portion of the structure 90 is recessed or cut away as at 92, for the accommodation in assembly of an inner supporting portion of the beater arm or bar, such portion being indicated generally at 93 in Fig. 4. The manner of application of the protective boot or sleeve to the bar, and its removal therefrom, is apparent from the comparison of the solid and dotted lines in Fig. 4.

By preference the boot such as 90 is of a fabric and rubber construction, the latter expression where used herein being intended to cover the use of synthetic rubber-like materials as well as natural rubber. The sleeve is also preferably provided with one or two plies of fabric or cords, for strength and wearing resistance.

In application of the boot, one of its end portions is inserted, for example, over the right hand end (Fig. 4) of the bar, and is then stretched lengthwise or axially of the bar, to bring its opposite annular portion over and beyond the opposite end of the bar, the resilience of the boot being such as to permit a degree of stretch sufficient for this mode of application. It will then readily appear that the opposite overhanging end of the bar will be brought to occupy the opposite annular portion 91 of the boot, the cutaway part 92 of the boot serving closely to embrace the depending radial supporting portion 93 of the beater arm. Removal of the boot for replacement purposes is effected by a sequence which is essentially the reverse of that described for application, namely, distention of one of the end portions 91 to bring it endwise beyond the bar end it engages; the boot may then be sleeved off of the opposite end of the bar without difficulty.

It will also appear as entirely practicable to utilize the outer wall 94 of the boot 90 as an expedient for augmenting the effective radial distance or height of the beater bars so equipped. This is advisable in some instances where the separator may be employed at times for threshing materials which require a lesser clearance between beaters and concave.

As particularly adapted for the continuing use of a wearing sleeve or boot, a modified bar construction, best shown by Figs. 6 and 7, has been evolved. In this arrangement the spider disc 100 is apertured as at 101, and has its peripheral portion embraced by furcations 102 which may be similar to or identical with the furcations 72 heretofore described. A fastening bolt 103 and a metal saddle or clip 104 completes this portion of the attachment assembly. The threshing bar section or beater is, in this modification, constructed essentially in the form of a loop, one of the sides of the loop being formed by integral resilient arm portions 105. The latter, at their extremities, are turned inwardly at about a right angle, to form a pair of normally aligned elements 106, the two portions 106 collectively constituting the opposite or outer side of the loop. Each of the portions 106, near the zone of their division, is characterized by a depending leg 107, the latter being provided with apertures 108 for the reception of a securement bolt 109, the latter also normally extending through a suitable aperture therefor in an upstanding lug portion 110.

In this modification the sleeve, indicated generally at 115, is of tubular form and one-piece construction, being of a fabric and rubber or rubber-like material substantially as described in connection with Fig. 3. According to the arrangement of Figs. 6 and 7, there are, however, provided in the lowermost or inner wall of the sleeve 115, a row of four openings, two of which are designated at 116, at the ends of the sleeve, and another pair shown at 117, located near the intermediate portion of the sleeve 115. As will appear from Fig. 6, the openings 116 each receives one of the arms 105, the openings 117 each accommodates one of the downturned legs 107. In this case the internal area of sleeve 115 is somewhat larger than the sectional area of the arms 106, from which it results that, with the bolt 109 removed, the arms 106 may be deflected outwardly at a considerable angle, the ends of the sleeve 115 converged and inserted over the ends of arms 106 and by some minor manipuative movement, the openings 116 brought over arms 105. Then when the sleeve is again restored to rectilinear shape and arms 106 brought into alignment, with the projections 107 through openings 117, the holding bolt 109 may be inserted in the position shown by Fig. 6. Removal of the sleeve 115 for purposes of replacement is effected by a series of steps essentially the reverse of that described for attachment.

The advantages of the present improvements in use and service are reflected chiefly, as above noted in the objects, in a softer threshing action with markedly less damage to the grain, grass, beans, or other crops being threshed, and in the further advantage that each of the bar sections or beater arms is susceptible, because of its resilience, of deflection or momentary deformation, particularly of the overhanging portions of the arms, thus enabling the threshing elements to pass without damage, stones or other foreign objects finding their way into the cylinder. In service and in periodic renewal of wearing elements, the present improvements exhibit a marked advantage. Obviously, from the relation and nature of parts described, any individual bar of any of the separate wheel-like units, may be removed and replaced with another, without necessarily disturbing any other bar or unit. Similarly, where desired, each unit may be replaced as a whole. Furthermore, the tremendous advantage in cost, enabled by minimization of mold sizes and hence in cost of curing equipment, will at once be apparent from the relatively small mass and dimensions of the individual beater arms.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. In a thresher, a bar-type cylinder adapted to coact with a concave, and constructed of a plurality of rotatably supported, laterally adjacent units, each of said units including a plurality of radially presented resilient sections forming threshing bar elements, and a boot for each section, the boot being formed of resilient material and characterized by spaced tubular portions detachably embracing end portions of the associated section, and including a wearing portion between said tubular portions, adapted to overlie the peripheral surface of the section on which the boot is mounted.

2. In a thresher cylinder, a supporting unit, an axially elongated peripheral beater bar attached to said unit, a replaceable protective boot adapted for detachable application to said bar, the boot being formed of a resilient stock and of a generally tubular form, with a ring-like portion at each of its ends for surrounding the ends of the section on which the boot is mounted, the boot being further characterized by an intermediate, open wall portion to accommodate a radial support for the bar section.

3. In a threshing cylinder, a plurality of axially short threshing elements adapted to coact with a stationary concave structure in the threshing of grain or the like, means in the cylinder for supporting the threshing elements, each of said elements consisting of a resilient body of molded resilient stock in the form of a loop, one side of which is peripherally presented to constitute the threshing portion of the element, a substantially tubular boot overlying the said peripherally presented side of the loop, the boot being provided with a series of apertures in one of its walls, and said peripherally presented side of the loop being intermediately divided, and provided with inturned, apertured holding portions, the opposite side of the loop being formed with an apertured projection, companion apertured projections extending through the apertures of the tubular member, an assembly bolt extending through the several said apertured members for positioning the divided side of the loop after application of the boot or sleeve, to the opposite side of the loop portion of the arm.

4. In a thresher, a bar-type cylinder adapted to coact with a concave, the cylinder including a plurality of radially presented threshing bar sections, each having an inwardly attaching projecting portion intermediate its ends and a boot for each section, the boot being formed of resilient material and characterized by spaced tubular portions detachably embracing end portions of the associated section, the boot including a portion between said tubular portions adapted to overlie the peripheral surface of the section and having an opening on the inner side through which said attaching portion projects.

5. In a rotary threshing device, a plurality of substantially T-shaped beater arms, a wearing boot for each of a plurality of said arms, said boot being formed of a fabric and a rubber-like material in the general form of a tube, the boot being open at its ends and provided with a wall recess inwardly of at least one of its ends, with said recess proportioned to receive the stem or supporting portion of the T-shaped beater arm in such manner that the wall portion of the boot embraces the stem portion of the beater arm whereby to limit both angular and axial movement of the boot on the arm.

HAROLD MAGINN.